(12) United States Patent
Calvo Martinez et al.

(10) Patent No.: US 11,970,147 B2
(45) Date of Patent: Apr. 30, 2024

(54) ASSEMBLY FOR AN ELECTROMECHANICAL BRAKE BOOSTER OF A VEHICLE BRAKING SYSTEM, BRAKE BOOSTER WITH SUCH AN ASSEMBLY, AND VEHICLE BRAKING SYSTEM WITH SUCH AN ASSEMBLY

(71) Applicant: ZF Active Safety GmbH, Koblenz (DE)

(72) Inventors: José Manuel Calvo Martinez, Kruft (DE); Jennifer Klein, Niederkassel (DE)

(73) Assignee: ZF Active Safety GmbH, Koblenz (DE)

( * ) Notice: Subject to any disclaimer, the term of this patent is extended or adjusted under 35 U.S.C. 154(b) by 117 days.

(21) Appl. No.: 17/218,779

(22) Filed: Mar. 31, 2021

(65) Prior Publication Data

US 2021/0309202 A1 Oct. 7, 2021

(30) Foreign Application Priority Data

Apr. 3, 2020 (DE) .......................... 102020109451.5

(51) Int. Cl.
*B60T 13/74* (2006.01)
*B60T 17/18* (2006.01)

(52) U.S. Cl.
CPC ............ *B60T 13/745* (2013.01); *B60T 17/18* (2013.01)

(58) Field of Classification Search
CPC .... B60T 13/145; B60T 13/745; B60T 13/575; B60T 13/66; B60T 7/042; B60T 17/18; B60T 11/20; F15B 7/08
See application file for complete search history.

(56) References Cited

U.S. PATENT DOCUMENTS 5,158,004 A * 10/1992 Bauer ................... B60T 13/575
  91/369.2
6,209,967 B1 * 4/2001 Kramer ................... B60T 13/72
  303/114.3
(Continued)

FOREIGN PATENT DOCUMENTS

DE       19523020 A1    8/2007
DE    102015217522 A1    3/2017
(Continued)

OTHER PUBLICATIONS

German Search Report for corresponding German Application Serial No. 10 2020 109 451.5, dated Aug. 5, 2022, pp. 1-6.

*Primary Examiner* — Nicholas J Lane
*Assistant Examiner* — Stephen M Bowes
(74) *Attorney, Agent, or Firm* — Kristin L. Murphy

(57) ABSTRACT

The present disclosure concerns an assembly (100) for an electromechanical brake booster (200) of a vehicle braking system (1000). The assembly (100) comprises a housing (160) which has a longitudinal axis (L) and can be loaded with an electromechanically generated actuating force, and an output element (150) which extends away from the housing (160) and is configured for transmitting the actuating force to a brake cylinder (300) of the vehicle braking system (1000). The assembly (100) furthermore comprises an elastic element (190) which is supported on the housing (160) and configured to move the housing (160) away from the brake cylinder (300) into a starting position, and a guide (180) which is arranged on the housing (160) for the output element (150) and is configured to guide an angular deflection of the output element (150) with respect to the longitudinal axis (L) of the housing (160).

20 Claims, 2 Drawing Sheets

(56) References Cited

U.S. PATENT DOCUMENTS

| | | | |
|---|---|---|---|
| 2012/0324882 A1* | 12/2012 | Mori | B60T 13/745 |
| | | | 60/545 |
| 2016/0101767 A1* | 4/2016 | Charpentier | B60T 13/745 |
| | | | 303/15 |
| 2016/0280196 A1* | 9/2016 | Zhang | B60T 13/745 |
| 2018/0251115 A1* | 9/2018 | Nagel | B60T 7/02 |
| 2019/0176785 A1* | 6/2019 | Hansmann | B60T 13/686 |
| 2019/0389439 A1 | 12/2019 | Panunzio et al. | |
| 2020/0180581 A1* | 6/2020 | Shigeta | F16H 25/20 |

FOREIGN PATENT DOCUMENTS

| | | |
|---|---|---|
| DE | 102020204834 A1 | 10/2021 |
| DE | 102020208764 A1 | 1/2022 |
| EP | 2292483 A1 | 3/2011 |

* cited by examiner

ASSEMBLY FOR AN ELECTROMECHANICAL BRAKE BOOSTER OF A VEHICLE BRAKING SYSTEM, BRAKE BOOSTER WITH SUCH AN ASSEMBLY, AND VEHICLE BRAKING SYSTEM WITH SUCH AN ASSEMBLY

RELATED APPLICATIONS

The present invention claims priority from 102020109451.5, filed 3 Apr. 2020, the entirety of which is incorporated herein by reference.

TECHNICAL FIELD

The present disclosure generally concerns an assembly for an electromechanical brake booster of a vehicle braking system. In concrete terms, aspects are described in connection with an elastic element acting on a housing of the assembly, and the guiding of a resulting angular deflection of an output element of the assembly during operation of the brake booster.

BACKGROUND

Known electromechanical brake boosters for vehicle braking systems are provided to amplify an actuating force generated by a driver via the brake pedal, so as to reduce the force application by the driver. This amplification is frequently achieved using an electrically operable actuator which, on operation, causes a displacement movement of one or more components of the brake servo, which increases a brake pressure in a brake cylinder. Modern electromechanical brake boosters may also build up a brake pressure by operation of the actuator alone, independently of actuation of the brake pedal, for example in an autonomous driving mode.

Conventional electromechanical brake boosters comprise a housing which can be loaded with an electromechanically generated actuating force by the actuator and is mounted movably. In order to transmit the electromechanically generated actuating force to the brake cylinder, the housing moves towards this. An output element transmits both the actuating force generated by the driver and the electromechanically generated actuating force to the brake cylinder. In order to move the housing back to its starting position after a braking process, an elastic element is provided which in many implementations is supported on an end face of the housing facing the brake cylinder.

On a return process by the elastic element, an uneven distribution of its return force on the housing may occur, for example because of movements between the assembly and the brake cylinder provoked in driving operation. The uneven distribution of the return force again may be transmitted to the output element, coupled directly or indirectly to the housing, and lead to a torsional moment acting on the output element relative to a longitudinal axis of the housing. Because of this torsional moment, in the region of the brake booster, mechanical artefacts occur such as shear forces and torsional moments which adversely affect the force transmission within the brake booster and may also lead to damage to its components.

SUMMARY

The present disclosure is based on the object of indicating a reliable assembly for an electromechanical brake booster of a vehicle braking system.

According to a first aspect, an assembly is provided for an electromechanical brake booster of a vehicle braking system. The assembly comprises a housing which has a longitudinal axis and can be loaded with an electromechanically generated actuating force, and an output element which extends away from the housing and is configured for transmitting the actuating force to a brake cylinder of the vehicle braking system. The assembly furthermore comprises an elastic element which is supported on the housing and configured to move the housing away from the brake cylinder into a starting position, and a guide which is arranged on the housing for the output element and is configured to guide an angular deflection of the output element with respect to the longitudinal axis of the housing.

The housing may be part of an actuator of the electromechanical brake booster or may cooperate with the actuator. On electrical actuation of the actuator, the housing may be displaced in a brake application direction in order to actuate the vehicle braking system. The housing may also be coupled directly or indirectly to a pressure piston of the brake cylinder, so that a displacement of the housing leads to a displacement of the pressure cylinder and hence to a build-up of brake pressure. Furthermore, the housing may be coupled to the output element such that a displacement of the housing may also lead to a displacement of the output element.

The elastic element may be supported on a support region of the housing provided to this end. The support region may be arranged on an end face or a side face of the housing. On its side facing away from the housing, the elastic element may be supported on a housing of the brake cylinder. The elastic element may be configured as a spring, e.g. a coil spring or a leaf spring. The elastic element may however also be made from an elastically deformable material such as rubber.

The starting position is the position of the housing which the housing has assumed before a transmission of the actuating force. In other words, the starting position is the position of the housing which the housing assumes when not loaded with the actuating force.

The guide may be attached to the housing by means of a fixing means configured to this end. The guide may be deformable so that the guide can at least partially follow the angular deflection of the output element. The guide may extend along a first portion of the output element received in the housing, and be configured to be brought into regional (e.g. linear) contact with this first portion in order to guide it. Additionally or alternatively, the guide may extend along a second portion of the output element protruding from the housing, and be configured to be brought into (e.g. superficial) contact with this second portion.

The portion(s) of the output element cooperating with the guide may cooperate with the guide in articulated fashion. At least in portions, the guide may be shaped correspondingly to an outer contour of the output element. For example, the cooperation may be achieved by means of curved regions, wherein a curvature of the guide region may be greater than a curvature of the region of the output element cooperating therewith.

The guide function may be limited to a specific angular range. The angular range may be greater than 0°, in particular greater than 5° or 10°. The angular range may be less than 40°, in particular less than 30° or 20°.

In a refinement, the elastic element is configured to generate a return force acting on the housing. In this refinement, the guide is furthermore configured to transmit the return force acting on the housing to the output element.

Thus the guide may cooperate functionally with the output element such that the output element, together with the housing loaded with the return force, can be moved into the starting position. In the case of an uneven distribution of the return force on the housing (and the output element which may be received therein), thus a resulting angular deflection of the output element may be corrected accordingly by means of the guide.

In some embodiments, the output element may comprise a shaft and a head facing the housing, wherein a diameter of the shaft is smaller than a diameter of the head. The head may be formed on an end of the shaft facing the housing. The guide may engage behind the head of the output element. In this way, for example, the return force acting on the housing against a brake application direction may be transmitted to the output element.

The output element may furthermore have a transitional portion which is arranged between the shaft and the head, and the diameter of which increases steplessly from the shaft to the head. The transitional portion may accordingly be curved. In this embodiment, the guide may be configured to cooperate with the transitional portion of the output element in order to guide the angular deflection of the output element. For example, at least in portions, the guide may be brought into contact with an outer contour of the transitional portion. The guide may be configured to cooperate with the transitional portion of the output element in a non-superficial, in particular in a linear fashion. The transitional portion of the output element may for example be brought into contact with the guide such that the output element can execute a rotational movement relative to the portion of the guide in contact with the transitional element.

According to the above embodiment, the guide may be configured to cooperate with the transitional portion in a region which, in the radial direction with respect to the longitudinal axis of the housing, lies closer to an outer diameter of the shaft than to an outer diameter of the head. Furthermore, the guide may have a guide portion which is curved in the direction of the diameter increase of the transitional portion and is or can come into contact with the transitional portion of the output element. The above-described rotational movement of the output element may be executed along this curved guide portion. In one exemplary embodiment, the guide portion may at least in portions have approximately the same or a greater curvature than the outer contour of the transitional portion.

According to a refinement, the housing may have a recess in which the head of the output element is received at least in portions. The guide may at least partially form a limit of the recess.

In a further embodiment, the guide may be a separate component which is attached to the housing. In particular, the guide may be configured as a sheet metal part.

In a refinement of the assembly, it is provided that the elastic element is supported on a force-receiving face protruding laterally from the housing. In other words, when considered in a direction along the longitudinal axis of the housing, the elastic element is supported in a radially outward region. In this embodiment, the elastic element is spaced radially further from a longitudinal axis of the housing than the maximum diameter of the output element. Thus the above-mentioned effect of an uneven distribution of the return force on the housing may occur to an even greater extent. Because of the correspondingly designed guide, the mechanical stresses occurring as a result of this uneven distribution of the return force may however also be compensated.

The force-receiving face may, at its end facing the housing, have a force-receiving portion which can cooperate with the side face of the housing. The return force is thereby transmitted evenly to the housing along the force-receiving face. Thus an overload of and/or damage to the force-receiving face can be prevented. The force-receiving face may be designed slightly elastic, in order to be able to better receive and/or transmit the return force which also acts elastically.

In a further embodiment, the assembly furthermore comprises an actuating member which can be loaded with an actuating force generated by means of a brake pedal and which is received in the housing, and an elastically deformable transmission element which is arranged to transmit force in a brake application direction between the actuating member and the housing on one side and the output element on the other, and is configured to receive the actuating force generated by means of the brake pedal from the actuating member and the electromechanically generated actuating force from the housing, and transmit both to the output element.

The actuating member may thus be received in the housing so as to be displaceable relative to the housing, namely in the brake application direction and in a direction opposite the brake application direction. The actuating member may at its one end be able to be coupled to the brake pedal via which the driver can apply the actuating force. The actuating member may in particular be displaced in the brake application direction by actuation of the brake pedal, and be returned to a rest position by means of the return force from a return spring and/or a brake cylinder. The actuating member may at its other end be configured to transmit the actuating force to the transmission element. The actuating member may be configured as an actuation rod with substantially circular cross-section. The actuating member may furthermore be coupled to the housing, for example by means of correspondingly formed coupling elements. A displacement of the actuating member may also lead to a displacement of the housing.

The transmission element may be formed as a disc (e.g. as a so-called reaction disc). The transmission element may have a radially outer face which can make contact with the housing in order to receive the electromechanically generated actuating force. The transmission element may furthermore have a radially inner face which may be configured to receive the actuating force generated by means of the brake pedal. During operation of the brake booster, such as on performance of a braking process, the transmission element may be or become elastically deformed for transmitting at least one of the two actuating forces to the output element.

According to a second aspect, an electromechanical brake booster for a vehicle braking system is provided, which comprises an assembly according to the disclosure and an electric motor and gear mechanism for loading the housing with an electromechanically generated actuating force.

The electromechanical brake booster may be provided for amplifying the braking force provided by actuation of a brake pedal. The electromechanical brake booster may also be provided to provide a braking force independently of actuation of the brake pedal, for example in an autonomous or partially autonomous driving mode. The gear mechanism may be functionally provided between the electric motor and the housing of the assembly.

According to a third aspect, a vehicle braking system is provided which comprises an assembly according to the first aspect or a brake booster according to the second aspect. The vehicle braking system may be configured to be operated in an autonomous or partially autonomous driving mode.

BRIEF DESCRIPTION OF THE FIGURES

Further aspects, details and advantages of the present disclosure arise from the following description of exemplary embodiments with reference to the figures. The drawings show.

DETAILED DESCRIPTION

Figure 1:
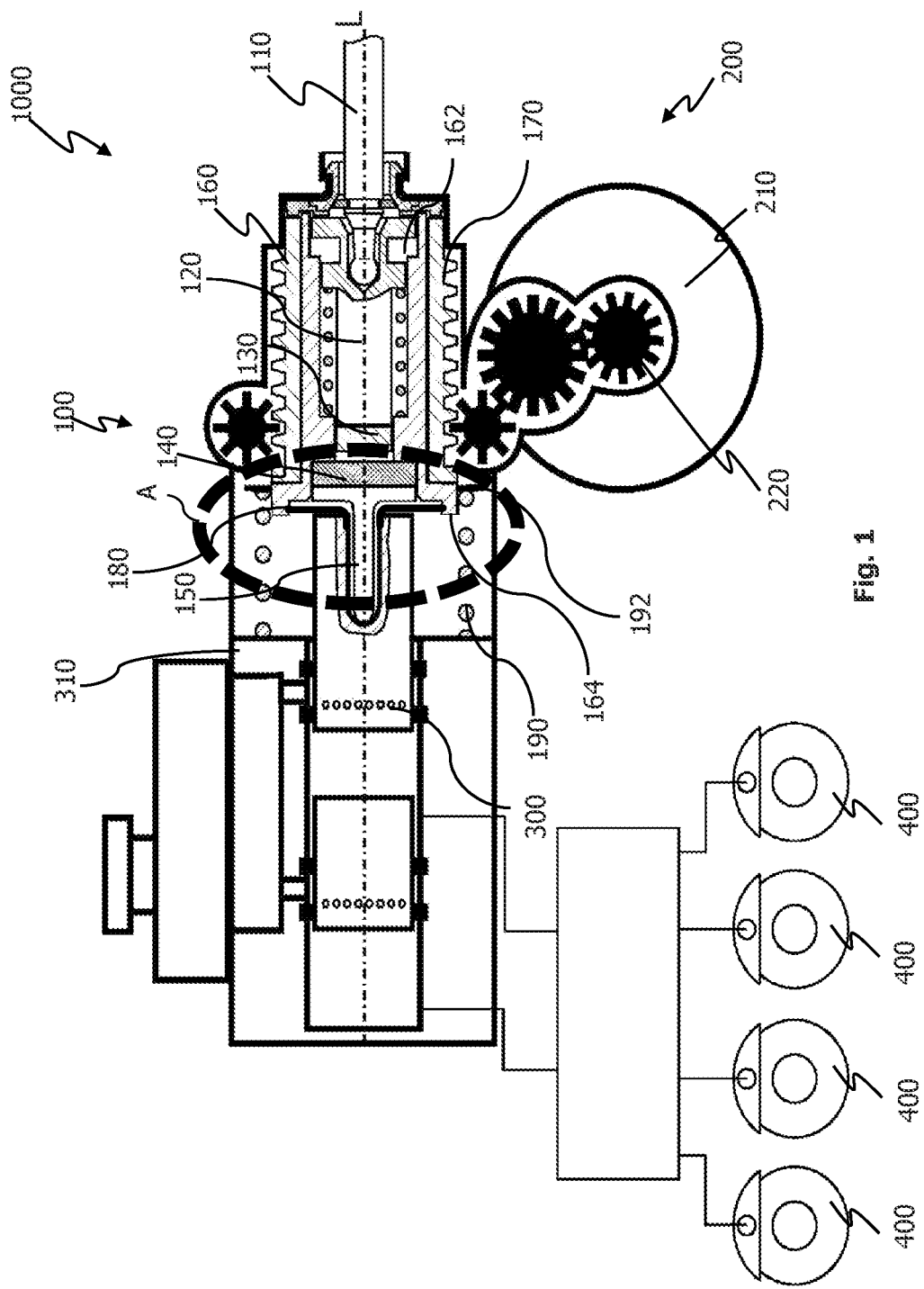
FIG. 1 schematically, a vehicle braking system with an electromechanical brake booster comprising an assembly according to the present disclosure.

FIG. 1 shows a vehicle braking system 1000 with several assemblies in the starting position. An assembly 100 of the vehicle braking system 1000 is here depicted as part of a brake booster 200. In the description below, firstly the structure and function of the vehicle braking system 1000 according to FIG. 1 will be described, as it may be used in exemplary embodiments.

The vehicle braking system 1000 according to FIG. 1 comprises—as well as the brake booster 200 with the assembly 100—a brake cylinder 300 and four wheel brakes 400 hydraulically connected to the brake cylinder 300. The brake cylinder 300 in this exemplary embodiment is a brake master cylinder of the vehicle braking system 1000.

The assembly 100 comprises a housing 160 into which an input element 110 protrudes. The input element 110 can be loaded with an actuating force generated by a driver by means of a brake pedal (not shown). An actuating member 120 is coupled force-transmissively to the input element 110. The actuating element 120 is received in a recess 162 of the housing 160. The actuating member 120 is guided within the recess 162 so as to be displaceable along a housing longitudinal axis L. The actuating force applied by the driver may be transmitted by the actuating member 120 via a sensing disc 130 to an elastically deformable, disc-like transmission element 140 (a so-called reaction disc).

The elastically deformable transmission element 140 is configured to receive the actuating force from the actuating member 120 (via the sensing disc 130) and an actuating force which is generated electromechanically and transmitted via the housing 160. Furthermore, the elastically deformable transmission element 140 is configured to transmit the sum of the two actuating forces to an output element 150. For the purpose of an even force transmission, the transmission element 140 is configured to be elastically deformable.

In the depiction of FIG. 1, the output element 150 is in contact with a side of the transmission element 140 facing away from the actuating member 120. The output element 150 is partially arranged in an end-face recess of the housing 160 facing the brake cylinder 300, and can be coupled force-transmissively to the transmission element 140 in order to conduct the forces introduced into the transmission element 140 to a piston in the brake cylinder 300 of the vehicle braking system 1000. Thus a hydraulic braking pressure, which can be supplied to the wheel brakes 400 via valves, is generated in the brake cylinder 300.

Further details of the force transmission within the brake booster 200 and the hydraulic pressure generation by means of the brake cylinder 300 are known to the person skilled in the art and do not require further explanation here.

As already stated, the housing 160 can be loaded with an electromechanically generated actuating force. In the depiction of FIG. 1, the force loading takes place by means of an actuating unit 170. The actuating unit 170 may be configured for example as a toothed sleeve which at least partially surrounds the housing 160 along its outer periphery. The housing 160 is coupled to the actuating unit 170 via a flange such that a displacement of the actuating unit 170 in the brake application direction along the longitudinal axis L also in each case leads to a displacement of the housing 160 in the brake application direction along the longitudinal axis L. In the embodiment shown in FIG. 1, in a starting position of the brake booster 200, the longitudinal axis L designates the longitudinal axis of the actuating member 120, the longitudinal axis of the output element 150, the longitudinal axis of the housing 160, and also the longitudinal axis of the actuating unit 170. In other words, these longitudinal axes run coaxially to each other.

For electromechanical generation of the actuating force, the brake booster 200 comprises an electrically actuatable electric motor 210 and a gear mechanism 220. The electric motor 210 and the gear mechanism 220 are configured to electromechanically generate the actuating force which can be applied additionally (or alternatively) to the brake cylinder 300 to support (or provoke alone) a braking process.

The electromechanically generated actuating force may be determined using the actuation travel covered by the brake pedal (or a component coupled thereto) and/or the brake pressure generated by the driver, for example by means of a travel sensor coupled to the brake pedal or the actuating member 120, or by measurement of the brake pressure generated in the brake cylinder 300 by the driver, which is detected by sensors and in some cases plausibility-checked. Alternatively, the deceleration request (and hence the actuating force to be applied electromechanically by means of the brake booster 200) may also be initiated by a system for autonomous or partially autonomous driving, so no actuating force from the actual driver is required. The vehicle braking system 1000 may be operated both in an autonomous and in a partially autonomous driving mode.

In an autonomous or partially autonomous driving mode, the actuating force acting on the brake cylinder 300 is generated solely by the electric motor 210 and the gear mechanism 220, without the driver needing to actuate the brake pedal (there is therefore no force amplification in the true sense). In a conventional driving mode, the actuating force acting on the brake cylinder 300 corresponds to the sum of the first actuating force applied by the driver and the amplifying actuating force.

To terminate a braking process, the housing 160 and the output element 150 are moved away from the brake cylinder 300 and back to their respective starting positions. The starting position corresponds to the position of the housing 160 which it assumes when not loaded with an actuating force (see FIG. 1). The return takes place by means of the brake pressure previously built up in the brake cylinder 300, and additionally by means of an elastic element 190 supported on the housing 160. In the depiction of FIG. 1, the elastic element 190 is configured as a coil spring. The present disclosure is not however restricted to this embodiment of the elastic element 190. Further designs of the elastic element 190, such as for example a leaf spring, are also conceivable.

Figure 2:
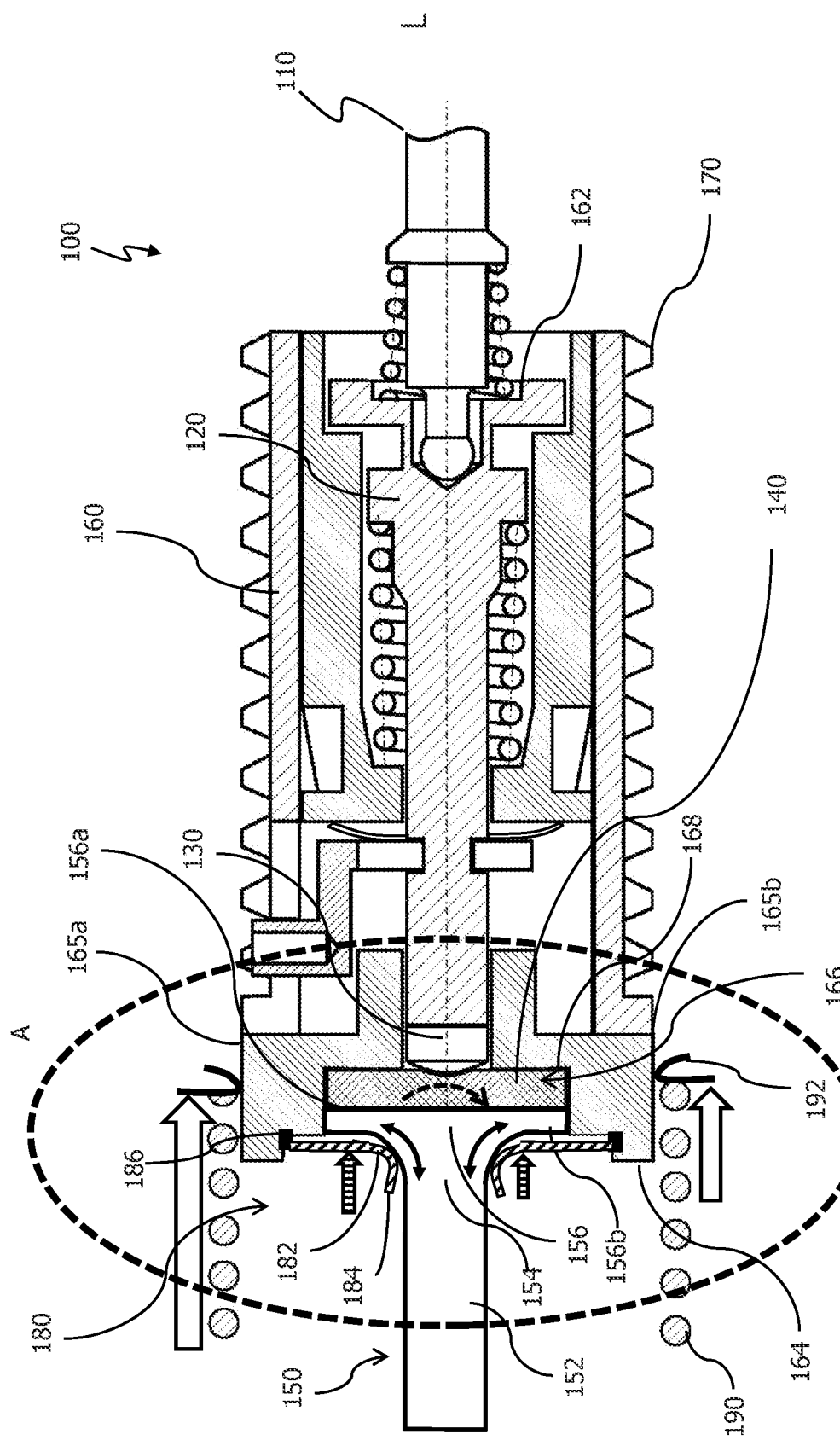
FIG. 2 schematically, in a sectional side view, an embodiment of an assembly for an electromechanical brake booster with a guide for an output element of the assembly according to the present disclosure.

In the exemplary embodiment, the elastic element 190 is supported on a force-receiving face 192 which protrudes laterally from the housing 160 (see in particular FIG. 2). On its other side, the elastic element 190 is supported on a housing 310 of the brake cylinder 300.

Depending on design and guidance of the elastic element 190, and on the present driving mode (e.g. driving over gravel track), the housing 160 does not always return completely parallel to the other components of the brake booster. Such tilting also leads to an uneven decompression of the elastic element 190. This uneven decompression may lead to various force components acting on the housing 160, which may differ in their direction and amount. In particular, tilting can occur, i.e. an angular deflection of the housing 160 relative to the output element 150. This may adversely affect the force transmission between the brake booster 200 and the brake cylinder 300. Also, mechanical artefacts may occur, such as shear forces and/or torsional moments within the brake booster 200, whereby the individual components of the brake booster 200 may be damaged.

By means of a guide 180 for the output element 150 provided in the region of the housing 160, this angular deflection can be guided and in some cases limited so as to avoid the above disadvantages. In the exemplary embodiment shown in FIG. 1, the guide 180 is here arranged on an end face 164 of the housing 160 facing the brake cylinder 300.

The further design of the guide 180 and elastic element 190 is described in more detail below with reference to FIG. 2. Here in particular the extract A indicated merely schematically in FIG. 1 is shown in more detail, and some components not shown in FIG. 1 for reasons of clarity are described more precisely.

FIG. 2 shows a more detailed but still partially schematic illustration of the assembly 100 already shown in FIG. 1 with a guide 180 for the output element 150 according to an embodiment. The same components carry the same reference signs as in FIG. 1. In FIG. 2, the longitudinal axis L again corresponds to the longitudinal axis of the actuating member 120, the longitudinal axis of the output element 150, and also the longitudinal axis of the housing 160.

By deviation from FIG. 1, in the assembly 100 shown in FIG. 2, a sensor carrier (without reference sign) in the form of a double L is rigidly coupled to the actuating member 120. The sensor carrier comprises a portion protruding from the housing 160 on which a travel sensor is attached. The travel covered by the actuating member 120 as detected in this way is used in a control unit to calculate the amplification force to be applied by means of the brake booster 200.

As evident from FIG. 2, the output element 150 is formed as a piston and comprises a shaft 152, a curved transitional region 154 and a head 156. The shaft 152 extends from the housing 160 and has a smaller diameter than the head 156. The head 156 is formed on an end of the shaft 152 facing the housing 160. The transitional portion 154 is arranged between the shaft 152 and the head 156. In the region of the transitional portion 154, a diameter of the output element 150 increases steplessly from the shaft 152 to the head 156.

In the depiction of FIG. 2, a recess 166 is formed in the end face of the housing 160 facing the brake cylinder 300. The recess 166 receives both the transmission element 140 and also the head 156 of the output element 150. An end face 156a of the head 156 facing the actuating member 120 is loosely in contact with the transmission element 140.

In FIG. 2, the elastic element 190 is again shown as a coil spring which is supported on force-receiving faces 192 protruding from opposite side faces 165a, 165b of the housing 160. Because the elastic element 190 is supported on the side faces 165a, 165b situated radially outward with respect to the longitudinal axis L, the return force is transmitted at a greater distance from the longitudinal axis L of the housing than if said element were supported on a region of the end face 164 of the housing 160 lying radially further inward. This however also means that, in the case of an uneven decompression of the elastic element 190, the lever arm is extended and leads to a greater torsional moment on the housing 160.

The uneven force transmission by means of the elastic element 190 is illustrated by the two different non-hatched arrows in FIG. 2. In this way, the above-mentioned mechanical artefacts can occur, in particular a torsional moment transmitted by the housing 160 to the output element 150 (indicated by the dotted curved arrow in FIG. 2), which may lead to damage to the elastically configured transmission element 140 for example. In order to limit this effect, according to the present disclosure, the guide 180 is provided for the output element 150.

In the depiction of FIG. 2, the guide 180 is shown as an example as a separate component which is attached to a fixing region 186 of the end face of the housing 160 provided to this end. The guide 180 may be attached to the fixing region 186 of the housing 160 by means of a releasable connection (e.g. by means of a screw or clamp) or a permanent connection (e.g. by means of welding).

As FIG. 2 shows, in a first portion, the guide 180 extends substantially parallel to the end face 164 of the housing 160. In particular, the guide 180 extends up to the shaft 152 of the output element 150, i.e. substantially along the entire end face 156b of the head 156 facing the brake cylinder 300 and facing away from the actuating member 120. According to FIG. 2, the guide 180 engages behind the head 156 of the output element 150 and thus forms a limit to the recess 166 of the housing 160.

Furthermore, the guide 180 comprises a curved guide portion 182. The guide portion 182 is curved in the direction of the diameter increase of the transitional portion 154 and may be brought into articulated contact with the transitional portion 154. The curvature of the guide portion 182 is here greater than that of the transitional portion 154 in order to guarantee a linear cooperation.

In the embodiment shown in FIG. 2, an end portion 184, which extends at least partially along the shaft 152, adjoins the guide portion 182 of the guide 180. In the exemplary embodiment of FIG. 2, the end portion 184 extends away from the shaft 152 at an angle to the longitudinal axis L.

The return force exerted by the elastic element 190 on the housing 160 may be transmitted to the guide 180, and hence to the output element 150, via the fixing region 186. This proportion of the return force of the elastic element 190 acting on the output element 150 is illustrated in FIG. 2 with the hatched arrows. In other words, the guide 180 is configured to be brought into contact with the output element 150 in particular on a return movement of the housing 160. Thus the output element 150 is held in the recess 166 of the housing 160. The guide 180 may be configured slightly flexibly (e.g. as a sheet metal part), whereby the guide 180 can partially follow a deflection of the output element 150 without a great reduction in the guidance function.

In any case, in many operating situations, the guide portion 182 of the guide 180 may be in contact with the transitional portion 154 of the output element 150. In the case of an uneven distribution of the return force on the output element 150 (in the exemplary embodiment of FIG. 2, illustrated by the non-dotted force arrows of different sizes), the portions of the output element 150 in contact with the guide 180 may be guided such that any torsional moment acting on the output element 150 can be reduced or in any case compensated.

For example, the curved transitional portion 154 of the output element 150 may be in contact with the curved guide portion 182 of the guide 180. The output element 150, under the effect of the return force, may execute a rotational movement relative to a rotational axis running perpendicular to the drawing plane and defined by the contact points of the guide portion 182 on the transitional portion 154. This rotational movement is illustrated in FIG. 2 by means of the double arrows shown there. This rotational movement may counter a torsional moment acting on the output element 150. At the same time as this rotational movement, under the effect of the return force, the output element 150 also executes a translational movement parallel to the longitudinal axis L. The guide 180 cooperates with the transitional portion 154 of the output element 150 not superficially in the sense of a superficial contact of the transitional portion 154 on the guide 180, but in linear fashion in the sense of a combination of contact with the transitional portion 154 and a rotation of the transitional portion 154 relative to the guide 180. The degrees of freedom of movement of the output element 150 are thereby reduced in a targeted fashion. In other words, a regionally guided tilting of the output element 150 relative to the housing 160 takes place. This tilting is limited by a superficial contact finally created between the end face 156b on the rear of the head 156 facing the brake cylinder 300 and the flat portion of the guide 180 between the guide portion 182 and the fixing region 186.

The solution disclosed herein firstly offers a possibility of support for the elastic element 190 supporting the return of the housing 160. As a result, no additional support face for the elastic element 190 need be provided on the end face 164 of the housing 160 on which a recess 166 for the output element 150 is already provided. The space available on the side faces 165a, 165b of the housing 160 is therefore used more effectively. Also, with this measure, the distance between the housing 160 and the housing 310 of the brake cylinder 300 may be reduced. Thus installation space may be saved.

Also, an uneven force transmission of the elastic element 190 between the assembly 100 and the brake cylinder 300 may be taken into account by a correspondingly designed guide 180 for the output element 150. In this way, the occurrence of mechanical stresses between the assembly 100 and the brake cylinder 300, in particular a torsional moment acting on the output element 150, may be substantially reduced or even avoided completely. The wear and risk of damage to the elements of the assembly 100, in particular the output element 150 and transmission element 140, are thereby reduced. The service life of the assembly 100 and brake booster 200 is thereby extended.

Above all, a guided relative movement is thus possible between the output element 150 and the housing 160. The output element 150 is therefore tiltable in targeted fashion with respect to the housing 160, wherein this tilting capacity is again limited for example to less than 30°. A relative movement is therefore not only permitted but guided in targeted fashion, but only to a limited extent. Since also the guide forces are introduced into the output element 150 close to the shaft 152 in the radial direction, the lever arm is comparatively small so that the guide 180 need only absorb low torsional moments (in comparison with a guide provided radially further outward).

What is claimed is:

1. An assembly (100) for an electromechanical brake booster (200) of a vehicle braking system (1000), the assembly comprising:
    a housing (160) which has a longitudinal axis (L) and can be loaded with an electromechanically generated actuating force;
    an output element (150) extending away from the housing (160) and configured for transmitting the actuating force to a brake cylinder (300) of the vehicle braking system (1000), the output element comprising a shaft (152) and a head (156) facing the housing (160), a diameter of the shaft (152) being smaller than a diameter of the head (156), a curved transitional surface (154) of the output element (150) being arranged between the shaft (152) and the head (156) such that a diameter of the output element (150) increases steplessly from the shaft (152) to the head (156);
    an elastic element (190) which is supported on the housing (160) and configured to move the housing (160) away from the brake cylinder (300) into a starting position; and
    a guide (180) which is arranged on the housing (160) for the output element (150) and is configured to guide an angular deflection of the output element (150) with respect to the longitudinal axis (L) of the housing (160), a portion of the guide (180) being configured to contact the curved transitional surface (154) of the output element (150) in such a manner that the output element (150) is rotatable relative to the portion of the guide (180) in contact with the curved transitional portion (154).

2. The assembly (100) as claimed in claim 1, wherein the elastic element (190) is configured to generate a return force acting on the housing (160), wherein the guide (180) is configured to transmit the return force acting on the housing (160) to the output element (150).

3. The assembly (100) as claimed in claim 1, wherein the housing (160) has a recess (166) in which the head (156) of the output element (150) is received at least in regions.

4. The assembly (100) as claimed in claim 3, wherein the guide (180) at least partially forms a limit of the recess (166).

5. The assembly (100) as claimed in claim 1, wherein the guide (180) is a separate component which is attached to the housing (160).

6. The assembly (100) as claimed in claim 5, wherein the guide (180) is formed as a sheet metal part.

7. The assembly (100) as claimed in claim 1, wherein the elastic element (190) is supported on a force-receiving face (192) which protrudes laterally from the housing (160).

8. The assembly (100) as claimed in claim 1, further comprising
    an actuating member (120) which can be loaded with an actuating force generated by means of a brake pedal and which extends into the housing (160);
    an elastically deformable transmission element (140) which is arranged to transmit force in a brake application direction between the actuating member (120) and the housing (160) on one side and the output element (150) on the other, and is configured to receive the actuating force generated by means of the brake pedal from the actuating member (120) and the electromechanically generated actuating force from the housing (160), and transmit both to the output element (150).

9. The assembly (100) as claimed in claim 8, wherein the transmission element (140) is external to and in contact with the output element (150).

10. An electromechanical brake booster (200) for a vehicle braking system (1000), comprising
the assembly (100) as claimed in claim 1, and
an electric motor (210) and a gear mechanism (220) for loading the housing (160) with an electromechanically generated actuating force.

11. A vehicle braking system (1000) comprising an assembly (100) as claimed in claim 1 or a brake booster (200) comprising the assembly (100) as claimed in claim 1 and an electric motor (210) and a gear mechanism (220) for loading the housing (160) with an electromechanically generated actuating force.

12. The vehicle braking system (1000) as claimed in claim 11, which is configured to be operated in an autonomous or partially autonomous driving mode.

13. The assembly (100) as claimed in claim 1, wherein the output element (150) rotates relative to the guide (180) as the output element (150) angularly deflects with respect to the longitudinal axis (L) of the housing.

14. The assembly (100) as claimed in claim 13, wherein the guide (180) is elastically deformable and elastically deforms as the output element (150) rotates relative to the guide (180).

15. An assembly (100) for an electromechanical brake booster (200) of a vehicle braking system (1000), the assembly comprising:
a housing (160) which has a longitudinal axis (L) and can be loaded with an electromechanically generated actuating force;
an output element (150) extending away from the housing (160) and configured for transmitting the actuating force to a brake cylinder (300) of the vehicle braking system (1000), the output element comprising a shaft (152) and a head (156) facing the housing (160), an outer diameter of the shaft (152) being smaller than an outer diameter of the head (156), a curved transitional surface (154) of the output element (150) being arranged between the shaft (152) and the head (156) such that a diameter of the output element (150) increases steplessly from the shaft (152) to the head (156);
an elastic element (190) which is supported on the housing (160) and configured to move the housing (160) away from the brake cylinder (300) into a starting position; and
a guide (180) which is arranged on the housing (160) for the output element (150) and is configured to guide an angular deflection of the output element (150) with respect to the longitudinal axis (L) of the housing (160), the guide (180) being configured to cooperate with h curved transitional surface (154) of the output element (150) in a region which, in the radial direction with respect to the longitudinal axis (L) of the housing (160), lies closer to the outer diameter of the shaft (152) than to the outer diameter of the head (156).

16. An electromechanical brake booster (200) for a vehicle braking system (1000), comprising
the assembly (100) as claimed in claim 15, and
an electric motor (210) and a gear mechanism (220) for loading the housing (160) with the electromechanically generated actuating force.

17. An assembly (100) for an electromechanical brake booster (200) of a vehicle braking system (1000), the assembly comprising:
a housing (160) which has a longitudinal axis (L) and can be loaded with an electromechanically generated actuating force;
an output element (150) extending away from the housing (160) and configured for transmitting the actuating force to a brake cylinder (300) of the vehicle braking system (1000), the output element (150) including a shaft (152) and a head (156) facing the housing (160), a diameter of the shaft (152) being smaller than a diameter of the head (156), a curved transitional surface (154) of the output element (150) being arranged between the shaft (152) and the head (156) such that a diameter of the output element (150) increases steplessly from the shaft (152) to the head (156);
an elastic element (190) which is supported on the housing (160) and configured to move the housing (160) away from the brake cylinder (300) into a starting position; and
a guide (180) which is arranged on the housing (160) for the output element (150) and is configured to guide an angular deflection of the output element (150) with respect to the longitudinal axis (L) of the housing (160), the guide (180) having a first end attached to the housing, a second end (184), and a curved guide portion (182) between the first and second ends, the curved guide portion (182) directly contacting the curved transitional surface (154) to guide the angular deflection of the output element (150) with respect to the longitudinal axis (L) of the housing (160).

18. The assembly (100) as claimed in claim 17, wherein the curved guide portion (182) is curved in the direction of the diameter increase of the transitional portion (154).

19. The assembly (100) as claimed in claim 17, wherein the curved guide portion (182) contacting the curved transitional surface (154) limits the angular deflection of the output element (150) relative to the housing (160).

20. An electromechanical brake booster (200) for a vehicle braking system (1000), comprising
the assembly (100) as claimed in claim 17, and
an electric motor (210) and a gear mechanism (220) for loading the housing (160) with the electromechanically generated actuating force.

\* \* \* \* \*